US008824017B2

(12) United States Patent
Tsai

(10) Patent No.: US 8,824,017 B2
(45) Date of Patent: Sep. 2, 2014

(54) PAPER DETECTOR WITH INDUCTED MODULE AND PRINTER USING THE SAME

(75) Inventor: Ting-Shi Tsai, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 178 days.

(21) Appl. No.: 13/544,999

(22) Filed: Jul. 10, 2012

(65) Prior Publication Data

US 2013/0271795 A1 Oct. 17, 2013

(30) Foreign Application Priority Data

Apr. 16, 2012 (TW) ............................ 101113481 A

(51) Int. Cl.
*H04N 1/40* (2006.01)
*G06K 19/06* (2006.01)

(52) U.S. Cl.
USPC ..... 358/3.24; 358/1.9; 358/3.32; 235/462.16; 235/462.17

(58) Field of Classification Search
None
See application file for complete search history.

(56) References Cited

U.S. PATENT DOCUMENTS 5,805,291 A * 9/1998 Calvin et al. .................. 356/429
6,769,754 B2 * 8/2004 Imanaka et al. .................. 347/7
7,872,444 B2 * 1/2011 Hamilton et al. ............. 320/108
8,222,824 B2 * 7/2012 Yamane et al. ........... 315/185 R
2011/0260642 A1 * 10/2011 Huang .......................... 315/294

FOREIGN PATENT DOCUMENTS

| | | |
|---|---|---|
| CN | 101473276 A | 7/2009 |
| JP | 2000-181638 | 6/2000 |
| JP | 2000-181833 | 6/2000 |
| JP | 2000-181838 | 6/2000 |
| TW | 508632 | 11/2002 |
| TW | I326855 | 7/2010 |
| WO | WO2007148709 | * 12/2007 |

OTHER PUBLICATIONS

Texas Instruments Incorporated, "Texas Instruments of OPA141, OPA2141 and OPA4141"(http://www.ti.com.cn/cn/lit/ds/zhcs450b/zhcs450b.pdf), Mar. 2010-May 2010, pp. 1-29.

* cited by examiner

*Primary Examiner* — Steven Kau
(74) *Attorney, Agent, or Firm* — Jianq Chyun IP Office

(57) ABSTRACT

A detector and a printer using the same are provided. The printer includes a body and the detector. The body has a base and a shaft located above the base. The detector includes multiple inducted modules, a carriage, an inducing unit, and a light receiving unit. The inducted modules are disposed on the base of the body aligning to an axial direction of the shaft. The carriage is disposed on the shaft. The inducing unit and the light receiving unit are disposed on the carriage. During a printing process, the carriage moves back and forth along the axial direction, and the inducing unit induces the corresponding inducted modules to emit lights. The light receiving unit receives light emitted from one of the inducted modules and penetrated a paper undergoing the printing process for detecting a paper barcode.

14 Claims, 3 Drawing Sheets

PAPER DETECTOR WITH INDUCTED MODULE AND PRINTER USING THE SAME

CROSS-REFERENCE TO RELATED APPLICATION

This application claims the priority benefit of Taiwan application serial no. 101113481, filed on Apr. 16, 2012. The entirety of the above-mentioned patent application is hereby incorporated by reference herein and made a part of this specification.

BACKGROUND

1. Field of the Invention

The invention relates to a detector and a printer, and more particularly to, a detector capable of achieving energy-saving-effect and a print using the same.

2. Description of Related Art

FIG. 1 is a schematic diagram illustrating a detector of a related art applied in a printer for detecting paper. Referring to the detector 100 of the related art in FIG. 1, a light receiving unit 110 is disposed on a carriage 120 that moves along a shaft (not shown), a plurality of light emitting units 130 is correspondingly disposed below the shaft (not shown) in a body (not shown) of a printer (not shown), and the light emitting units 130 are located on the moving path of the light receiving unit 110. A circuit board 140 provides electricity to the light emitting units 130 for enabling the light emitting units 130 to emit light.

During a printing process, paper enters to a position between the carriage 120 used for carrying ink cartridges and the light receiving units 130, and the circuit board 140 provides electricity for enabling the light emitting units 130 to concurrently emit light. Following the movement of the carriage 120 along the shaft, the light receiving unit 110 disposed on the carriage 120 accepts light emitted from the light emitting units 130 and penetrating through the paper, wherein light emitted from the light emitting unit 130 is infrared rays (IR), and the light receiving unit 110 obtains a barcode information on the paper according to the received light signal, so as to let the printer to know the paper properties for arranging the best printing mode.

In the printer of the related art, circuit design of the light emitting unit 130 is in form of series; therefore, during the paper detection, electricity provided by the circuit board 140, for enabling all the light emitting units 130 to concurrently emit light, is considerably consuming. Nevertheless, if the circuit of the light emitting unit 130 is designed in form of parallel, the circuit layout would be much intricate. Moreover, a connection line or a connector is needed to electrically connect in between the circuit board 140 and the light emitting unit 130, thus increasing assembly difficulty.

SUMMARY OF THE INVENTION

The invention provides a detector using principle of induced current for performing detection.

The invention provides a printer using the detector to perform barcode detection for a paper undergoing a printing process.

The invention provides a detector comprising N inducted modules, a carriage, an inducing unit, and a light receiving unit. The inducted modules are aligned to a moving direction, wherein N is a positive integer greater than or equal to 1. The carriage is disposed on a light emitting side of the inducted modules and is suitable for moving back and forth in the moving direction. The inducing unit and the light receiving unit are both disposed on the carriage, and the inducing unit is located corresponding to a light emitting side of an nth inducted module when the carriage moves along the moving direction, wherein n is a positive integer less than or equal to N, the inducing unit induces the nth inducted module to emit light by induced current, and the light receiving unit receives light emitted from the nth inducted module.

In an exemplary embodiment of the detector, each of the inducted modules comprises a magnetic induction unit and a light emitting unit, wherein the light emitting unit is disposed next to the magnetic induction unit and electrically connected with the magnetic induction unit. Each of the magnetic induction units comprises a magnetic core and a magnetic induction coil surrounding the magnetic core.

In an exemplary embodiment of the detector, the inducing unit is located in the relative front of the light receiving unit when the carriage moves along the moving direction, and the magnetic induction units and the light emitting units are sequentially staggered towards the moving direction.

In an exemplary embodiment of the detector, each of the inducted modules is electrically independent from each other.

In an exemplary embodiment of the detector, the inducing unit is a magnet or a magnetic coil.

In an exemplary embodiment of the detector, the inducing unit has an operational amplifier. The operational amplifier comprises a noninverting node, an inverting node, a power input terminal, a grounding terminal, and an output terminal. The light receiving unit is electrically connected to a capacitance located between the inverting node of the operational amplifier and the grounding terminal, whereas the noninverting node is electrically connected to the power input terminal, and the output terminal is electrically connected to a resistor and further to a processor.

The invention additionally provides a printer comprising a body and a detector. The body has a base and a shaft, wherein the shaft is located above the base. The detector comprises N inducted modules, a carriage, an inducing unit, and a light receiving unit. The inducted modules are disposed on a base of the body aligning an axial direction of the shaft, wherein N is a positive integer greater than or equal to 1. The carriage is disposed on the shaft and located on a light emitting side of the inducted modules, and the carriage is suitable for moving back and forth along the axial direction of the shaft. The inducing unit and the light receiving unit are both disposed on the carriage. When the printer is performing a printing process, the carriage moves along the axial direction, and the inducing unit sequentially induces an nth inducted module to emit light by induced current, wherein n is a positive integer less than or equal to N, the light receiving unit receives light emitted from the nth inducted module and penetrated a paper undergoing a printing process for detecting a paper barcode.

In an exemplary embodiment of the printer, each of the inducted modules comprises a magnetic induction unit and a light emitting unit disposed next to the magnetic induction unit, and the light emitting unit is electrically connected with the magnetic induction unit. Each of the magnetic induction units comprises a magnetic core and a magnetic induction coil surrounding the magnetic core.

In an exemplary embodiment of the printer, the inducing unit is located in a relative front of the light receiving unit when the carriage on the axial direction is moving towards the moving direction in order to perform the printing process, and the magnetic induction units and the light emitting units are sequentially staggered towards the moving direction.

In an exemplary embodiment of the printer, each of the inducted modules is electrically independent from each other.

In an exemplary embodiment of the printer, the inducing unit is a magnet or a magnetic coil.

In an exemplary embodiment of the printer, the inducing unit has an operational amplifier. The operational amplifier comprises a noninverting node, an inverting node, a power input terminal, a grounding terminal, and an output terminal. The light receiving unit is electrically connected to a capacitance located between the inverting node of the operational amplifier and the grounding terminal, whereas the noninverting node is electrically connected to the power input terminal, and the output terminal is electrically connected to a resistor and further to a processor.

According to the above, the detector of the invention uses the principle of induced current induced by the inducted modules and the inducing unit for enabling the inducted modules to emit light. By applying the detector to the printer for detecting the paper barcode, it is able to reduce the complex circuit design in the printer of the related art, simplify the product assembly process, and achieve power-saving effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The following describes the components and the relative positions thereof for a detector of the invention with an exemplary embodiment of the detector in the application of a printer. The exemplary embodiment is only provided for illustration purpose, the application range of the detector is not limited thereto; one of ordinary skill in the art would be able to add or delete the components in combination of the detector in response to requirements, and to apply the detector in different machineries and equipments.

Figure 1:
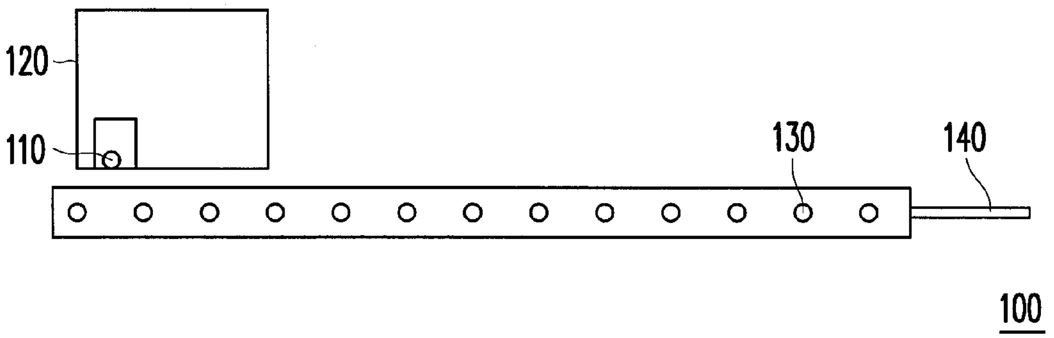
FIG. 1 (RELATED ART)
FIG. 1 is a schematic diagram illustrating a detector of a related art applied in a printer for paper detection.
Figure 2:
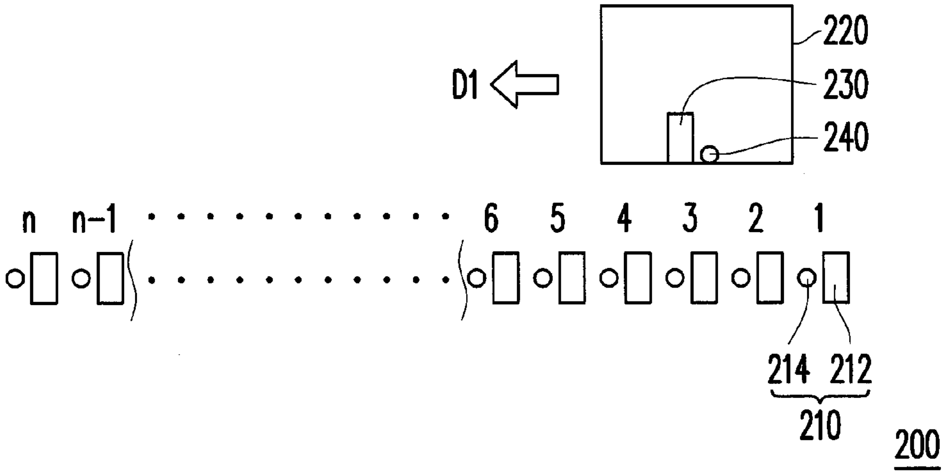
FIG. 2 is a schematic diagram illustrating a detector in accordance with an exemplary embodiment.

FIG. 2 is a schematic diagram illustrating a detector in accordance with an exemplary embodiment. With reference to FIG. 2, the detector 200 of the exemplary embodiment includes N inducted modules 210, a carriage 220, an inducing unit 230, and a light receiving unit 240, wherein N is a positive integer greater than or equal to 1, and the inducted modules 210 is aligned to a moving direction D1. The carriage 220 is disposed on the light emitting side of the inducted modules 210 and is suitable for moving back and forth in the moving direction D1, and the inducing unit 230 and the light receiving unit 240 are both disposed on the carriage 220.

Figure 5:
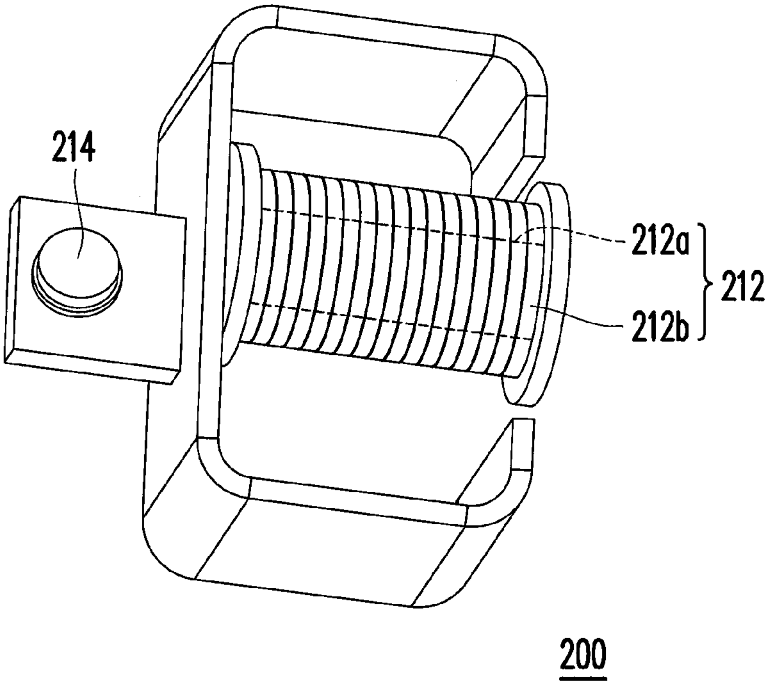
FIG. 5 is a schematic diagram illustrating the inducted module in FIG. 4.

Accordingly, each of the inducted modules 210 is electrically independent from each other; viz., the inducted modules 210 are not electrically connected with each others. Therefore when one single inducted module 210 emits light, the neighbouring inducted modules 210 would not be influenced by the light-emitting inducted module 210 to induce current and emit light. Each of the inducted modules 210 includes a magnetic induction unit 212 and a light emitting unit 214, wherein each of the magnetic induction units 212 comprises a magnetic core 212*a* and a magnetic induction coil 212*b* surrounding the magnetic core 212*a*. The light emitting unit 214 is disposed next to the magnetic induction unit 212, and two ends of the magnetic induction coil 212*b* are connected to the light emitting unit 214 in order to electrically connect the light emitting unit 214 with the magnetic induction unit 212, as shown in FIG. 5. In addition, the inducing unit 230 is a magnet, or may also be a magnetic coil, which is of the same structure to the one used in the magnetic induction unit 212, according to the requirements.

In respect of the relative positions of the components, the carriage 220 moves towards the moving direction D1 in order to pass through the inducted modules 210 arranged in a row, the inducing unit 230 is located in a relative front of the light receiving unit 240, and the magnetic induction units 212 and the light emitting units 214 are sequentially staggered. In the other word, when the carriage 220 is moving towards the moving direction D1, the inducing unit 230 sequentially passes through N numbers of magnetic induction units 212 and light emitting units 214 that are staggered with each other.

In general, when using the detector 200, the inducing unit 230 sequentially passes through n inducted modules 210 arranged in a row, wherein n is a positive integer less than or equal to N, and the inducing unit 230, following the lead of the carriage 220, continuously moves towards the moving direction D1, causing the magnetic field of the magnetic induction units 212 of the inducted modules 210, wherein the position of the magnetic induction units 212 is corresponding to the inducing unit 230, to change, and thus generating an induced electromotive force (EMF). Since two ends of the magnetic induction coil 212*b* of the magnetic induction unit 212 are connected with loads (light emitting unit 214), inducing the generation of induced current, the light emitting unit 214 begins to emit light, and the light receiving unit 230 receives light emitted from the corresponding light emitting unit 214.

The following below employs the application of the detector 200 in a printer as illustration, wherein the application of the detector 200 in the printer may be used to detect a barcode of a paper entering the printer, wherein the barcode on the paper is usually invisible in order to avoid influencing the printing quality, the barcode is recorded with the materials, appropriate printing ranges and methods of the paper, and the detector 200 further transmits the detected barcode information back to the printer in order to provide an appropriate mode for printing the paper.

Figure 3:
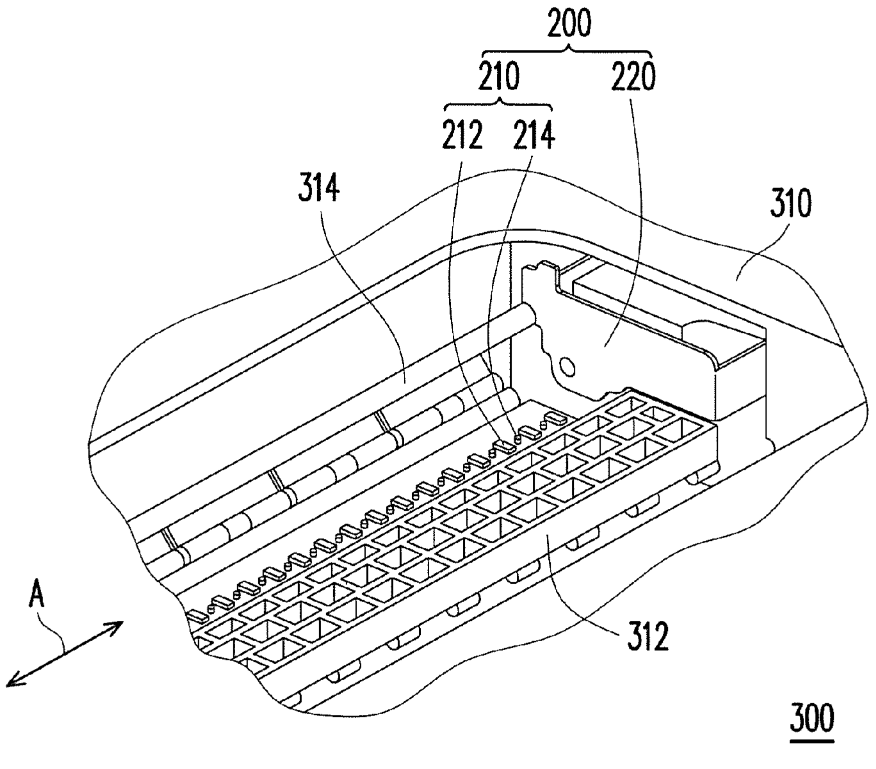
FIG. 3 is a schematic diagram illustrating the detector in FIG. 2 being applied in the printer.

FIG. 3 is a schematic diagram illustrating the detector in FIG. 2 being applied in the printer. With reference to FIG. 3, the printer 300 includes a body 310 and the aforementioned detector 200 for detecting the paper barcode. The body 310 ahs a base 312 and a shaft 314, wherein the shaft 314 is located above the base 312, and the inducted modules 210 of the detector 200 is disposed on the base 312 of the body 310 aligning an axial direction A of the shaft 314. The carriage 220, upon which the inducing unit 230 and the light receiving unit 240 are disposed on, is disposed on the shaft 314 and is located on a light emitting side of the inducted modules 210, and the carriage 220 may move back and forth along the axial direction A of the shaft 314.

Figure 4:
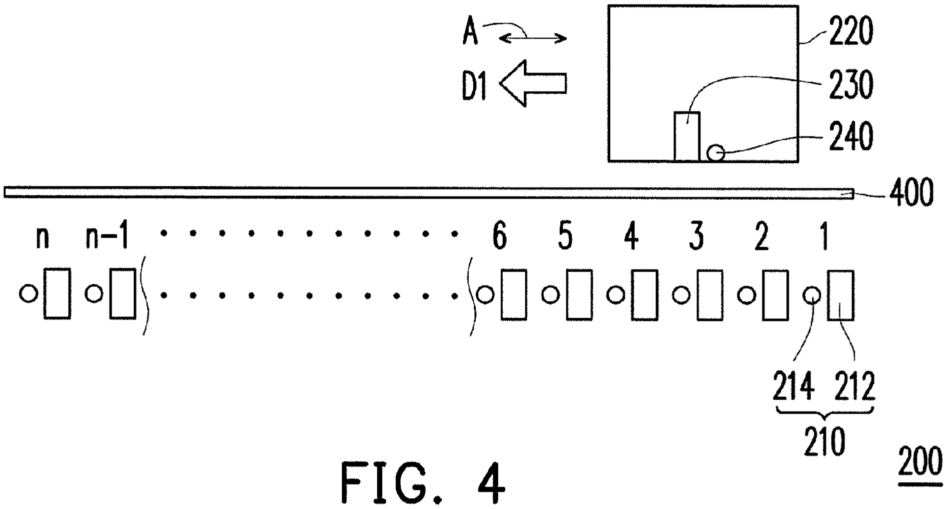
FIG. 4 is a schematic diagram illustrating the detector being used to perform paper detection in accordance with the exemplary embodiment.

FIG. 4 is a schematic diagram illustrating the detector being used to perform paper detection in accordance with the exemplary embodiment. When the printer 300 is performing the printing process, the carriage 220 is firstly moving along the axial direction A towards the moving direction D1, and then the inducing unit 230 is sequentially inducing the passed through inducted modules 210 to induce current and to emit light. Specifically, since the inducing unit 230 is disposed on the carriage 220, the inducing unit 230 is to follow along the carriage 220 to move from the first inducted module 210 to the nth inducted module 210.

Following the movement of the carriage 220 when the inducing unit 230 moves away from the n−2 inducted module 210 to be close to the n−1 inducted module 210, wherein n is a positive integer less than or equal to N, the n−2 inducted module 210 loses the incentive to generate the induced electromotive force following the moving away of the inducing unit 230, the induced current is disappeared, and the n−2 magnetic induction unit 212 electrically connected with the light emitting unit 214 stops to emit light.

With the carriage 220 moving close to the n−1 inducted module 210 and moving away from the n−1 inducted module 210 to the nth inducted module 210, the magnetic field variation between the inducing unit 230 and the magnetic induction unit 212 of the n−1 inducted module 210 generates the induced electromotive force, and since the two ends of the magnetic induction coil 212*b* of the magnetic induction unit 212 of the n−1 inducted module 210 are correspondingly connected with the light emitting unit 214 (load), the induced current is generated, causing the light emitting unit 214 to start to emit light. In the exemplary embodiment, the light emitting unit 214 is infrared rays light emitting diode (IR LED), and light emitted from the light emitting unit 214 penetrates a paper 400, which is undergoing the printing process.

Similarly, when the inducing unit 230 moves away from the n−1 inducted module 210 to close to the nth inducted module 210 and moves away from the nth inducted module 210 to close to the n+1 inducted module 210 (herein n is a positive integer less than N), the n−1 inducted module 210 stops to emit light and then the nth inducted module 210 starts to emit light.

In this way, following along the direction of movement of the carriage 220, the magnetic induction units 212 of the inducted modules 210 are sequentially influenced by the inducing unit 230 to generate induced current and cause the corresponding electrically connected light emitting units 214 to emit light, and the light receiving unit 240 disposed on the carriage 220 synchronously obtains the barcode information according to the intensity of the received light.

Figure 6:
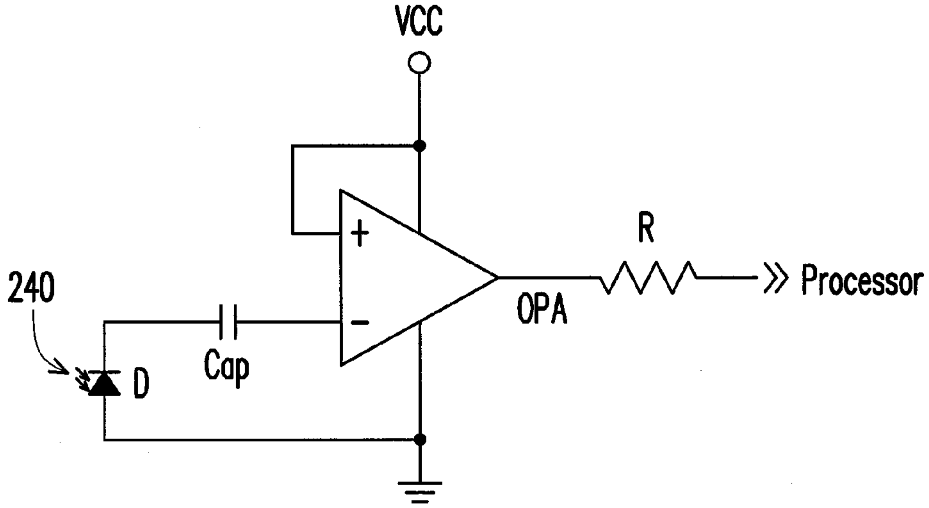
FIG. 6 is a circuit schematic diagram illustrating an inducing unit in FIG. 4.

Referring to FIG. 6, FIG. 6 descriptively illustrates the detailed circuit diagram of the inducing unit 230. In a feasible exemplary embodiment, the inducing unit 230 has an operational amplifier OPA, and the operational amplifier OPA and the light receiving unit 240 constitute an integrated circuit. The operational amplifier OPA comprises a noninverting node (+), an inverting node (−), a power input terminal VCC, a grounding terminal, and an output terminal. The light receiving unit 240 is electrically connected to a capacitance between the inverting node (−) of the operational amplifier OPA and the grounding terminal, whereas the noninverting node (+) is electrically connected to the power input terminal VCC, the output terminal is electrically connected to a resistor R and is further electrically connected to a processor (Processor). After the light receiving unit 240 transmits the detected signal to the operational amplifier OPA to amplify the signal, the signal is then transmitted to a circuit board (not shown) in the printer 300 so the processor (Processor) may perform signal processing, thus enabling the printer 300 to provide the paper with a perfect printing mode.

In order to illustrate a smooth detection process of the detector 200, the movement of the carriage 220 towards the moving direction D1 is taken as an example. The structure of the detector 200 is basically as follows: because the carriage 220 is moving towards the moving direction D1 to perform printing process, as facing towards the moving direction D1, the inducing unit 230 concurrently disposed on the carriage 220 is located in the relative front of the light receiving unit 240, and the magnetic induction units 212 and the light emitting units 214 are sequentially staggered towards the moving direction D1. With such configuration, during the printing process, the inducing unit 230 located in the relative front is to sequentially pass through the staggered magnetic induction units 212 and light emitting units 214.

Specifically, the inducing unit 230 located in the relative front firstly passes through the magnetic induction unit 212 and then couples with the magnetic induction unit 212 to generate the induced current for enabling the light emitting unit 214 to emit light; and following the movement of the carriage 220, the location of the light receiving unit 240 located in the relative back is corresponded to the location of the light emitting unit 214 when the inducing unit 230 passes through the light emitting unit 214 and continues to move close to the next magnetic induction unit 212, so as to facilitate the light receiving unit 240 to receive light emitted from the light emitting unit 214 after penetrating through the paper 400.

Moreover, the disposition of the inducing unit 230 in the relative front of the light receiving unit 240, and of the light emitting unit 214 in the relative front of the magnetic induction unit 212, enables the inducing unit 230 to firstly couple with the magnetic induction unit 212 to generate the induced current, and when the light emitting unit 214 located in the relative front, facing towards the moving direction D1 of the carriage 220, is emitting light, the location of the light receiving unit 240 disposed on the carriage 220, following the movement of the carriage 220 towards the moving direction D1, is corresponded to the location of the light emitting unit 214, thus having a good detection result.

Accordingly, when the movement of direction of the carriage 220 is changed, under the circumstance of not influencing the detection result and detection fluency, the corresponding locations between the inducing unit 230, the light receiving unit 240, the light emitting units 214, and the magnetic induction units 212 also have to change.

Particularly, in comparison with the relative art that uses a connection line or a connector to enable the circuit board to provide electricity to the light emitting unit 214, no connection line or connector for transmitting electricity is needed to be disposed between the detector 200 and the circuit board of the printer 300 of the exemplary embodiment, and the magnetic field variation is induced to facilitate the generation of the induced current through moving the inducing unit 230 in relative to the magnetic induction units 212, thus forming spontaneous electricity for supplying to the light emitting units 214 of the inducted modules 210.

Therefore, the detector and the printer using the same of the exemplary embodiment at least have the following distinctions and advantages:

1. The structure of the detector of the invention is different from the structure of the detector of the related art.

2. The movement of the carriage induces the inducing unit to move in relative to the magnetic induction units in order to use the magnetic field variation to generate the induced current. Since the electricity is not provided to the detector by the circuit board, no connection line or connector is needed between the circuit board and the detector, and thus, in comparison to the related art, the cost for the connection line or the connector, man power, and assembly time are saved.
3. The inducing unit sequentially passes through the inducted modules arranged in a row, and the inducted modules located in correspondences to the inducing unit, after being induced, is to generate the induced current for enabling the correspondingly electrically connected light emitting units to emit light. Therefore, the light emitting units of the inducted modules are sequentially illuminated and not concurrently illuminated.
4. Since electricity to the detector is not provided by the circuit board, a power-saving effect is achieved.
5. Because no connection line or connector for providing electricity is needed to be disposed between the detector and the circuit board, the circuit layout of the circuit board may be further simplified due to the reduction of connection line or connector.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A paper detector with inducted module comprising:

N inducted modules aligned to a moving direction, wherein N is a positive integer greater than or equal to 1;

a carriage disposed on a light emitting side of the inducted modules and suitable for moving back and forth in a moving direction;

an inducing unit disposed on the carriage; and a light receiving unit disposed on the carriage, the inducing unit located corresponding to the light emitting side of an nth inducted module when the carriage moves along the moving direction, wherein n is a positive integer less than or equal to N, the inducing unit induces the nth inducted module to emit light by a induced current, and the light receiving unit receives light emitted from the nth inducted module.

2. The paper detector with inducted module as claimed in claim 1, wherein each of the inducted modules comprises:

a magnetic induction unit; and a light emitting unit disposed next to the magnetic induction unit and electrically connected with the magnetic induction unit.

3. The paper detector with inducted module as claimed in claim 2, wherein each of the magnetic induction units comprises:

a magnetic core; and a magnetic induction coil surrounding the magnetic core.

4. The paper detector with inducted module as claimed in claim 2, wherein the inducing unit is located in a relative front of the light receiving unit when the carriage moves along the moving direction, and the magnetic induction units and the light emitting units are sequentially staggered towards the moving direction.

5. The paper detector with inducted module as claimed in claim 1, wherein each of the inducted modules is electrically independent from each other.

6. The paper detector with inducted module as claimed in claim 1, wherein the inducing unit is a magnet or a magnetic coil.

7. The paper detector with inducted module as claimed in claim 1, wherein the inducing unit has an operational amplifier comprising a noninverting node, an inverting node, a power input terminal, a grounding terminal, and an output terminal, the light receiving unit is electrically connected to a capacitance located between the inverting node of the operational amplifier and the grounding terminal, whereas the noninverting node is electrically connected to the power input terminal, and the output terminal is electrically connected to a resistor and further to a processor.

8. A printer comprising:

a body having a base and a shaft, wherein the shaft is located above the base;

a paper detector with inducted module comprising:

N inducted modules disposed at the base of the body and aligned to an axial direction of the shaft, wherein N is a positive integer greater than or equal to 1;

a carriage disposed on the shaft and located on a light emitting side of the inducted modules, and the carriage being suitable for moving back and forth along the axial direction of the shaft;

an inducing unit disposed on the carriage; and a light receiving unit disposed on the carriage, wherein when the printer is performing a printing process, the carriage moves along the axial direction, the inducing unit sequentially induces an nth inducted module to emit light by a induced current, n is a positive integer less than or equal to N, and the light receiving unit receives light emitted from the nth inducted module and penetrated a paper undergoing the printing process for detecting a paper barcode.

9. The printer as claimed in claim 8, wherein each of the inducted modules comprises:

a magnetic induction unit; and a light emitting unit disposed next to the magnetic induction unit and electrically connected with the magnetic induction unit.

10. The printer as claimed in claim 9, wherein each of the magnetic induction units comprises:

a magnetic core; and a magnetic induction coil surrounding the magnetic core.

11. The printer as claimed in claim 9, wherein the inducing unit is located in a relative front of the light receiving unit when the carriage on the axial direction is moving towards a moving direction in order to perform the printing process, and the magnetic induction units and the light emitting units are sequentially staggered towards the moving direction.

12. The printer as claimed in claim 8, wherein each of the inducted modules is electrically independent from each other.

13. The printer as claimed in claim 8, wherein the inducing unit is a magnet or a magnetic coil.

14. The printer as claimed in claim 8, wherein the inducing unit has an operational amplifier comprising a noninverting node, an inverting node, a power input terminal, a grounding terminal, and an output terminal, the light receiving unit is electrically connected to a capacitance located between the inverting node of the operational amplifier and the grounding terminal, whereas the noninverting node is electrically connected to the power input terminal, and the output terminal is electrically connected to a resistor and further to a processor.

* * * * *